US011548760B2

(12) United States Patent
Tsubaki

(10) Patent No.: US 11,548,760 B2
(45) Date of Patent: Jan. 10, 2023

(54) ELEVATOR DISPLAY SYSTEM

(71) Applicant: MITSUBISHI ELECTRIC CORPORATION, Tokyo (JP)

(72) Inventor: Yasunori Tsubaki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 328 days.

(21) Appl. No.: 16/615,546

(22) PCT Filed: Jul. 10, 2017

(86) PCT No.: PCT/JP2017/025070
§ 371 (c)(1),
(2) Date: Nov. 21, 2019

(87) PCT Pub. No.: WO2019/012571
PCT Pub. Date: Jan. 17, 2019

(65) Prior Publication Data
US 2020/0172372 A1 Jun. 4, 2020

(51) Int. Cl.
B66B 3/00 (2006.01)
B66B 1/34 (2006.01)
B66B 1/50 (2006.01)
B66B 1/52 (2006.01)
G06V 20/00 (2022.01)

(52) U.S. Cl.
CPC ............ B66B 3/008 (2013.01); B66B 1/3492 (2013.01); B66B 1/50 (2013.01); B66B 1/52 (2013.01); G06V 20/00 (2022.01)

(58) Field of Classification Search
CPC ......... B66B 3/008; B66B 3/00; B66B 5/0012; B66B 1/3492; B66B 1/3415; B66B 11/02; B66B 3/002; B66B 13/14; B66B 3/006
See application file for complete search history.

(56) References Cited

FOREIGN PATENT DOCUMENTS

JP   2005-200203 A    7/2005
JP    2005200203 A  *  7/2005
(Continued)

OTHER PUBLICATIONS

Office Action dated Aug. 26, 2020 in counterpart Chinese Patent Application No. 201780092611.5 and an English Translation.
(Continued)

Primary Examiner — Marlon T Fletcher
(74) Attorney, Agent, or Firm — Birch, Stewart, Kolasch & Birch, LLP

(57) ABSTRACT

An elevator display system includes: a sensing device that acquires sensing data indicating condition of an inside of a cage; a mirror display device arranged in the cage on a side opposite to an elevator door, functions in a first state as a mirror, and functions in a second state as an image display unit; a content generation unit that generates display image data to be displayed on the mirror display device; an in-cage condition judgment unit that judges condition of a user in the cage from the sensing data and outputs user information regarding the condition of the user; and a display control unit that outputs a control signal requesting generation of display image data for setting a display state of a display surface of the mirror display device to the first state or the second state to the display image generation unit based on the user information.

13 Claims, 12 Drawing Sheets

(56) References Cited

FOREIGN PATENT DOCUMENTS

| JP | 2009-62104 A | | 3/2009 | |
|---|---|---|---|---|
| JP | 2009062104 A | * | 3/2009 | |
| JP | 5969090 B1 | * | 8/2016 | |
| JP | 6194067 B1 | * | 9/2017 | |
| JP | 6275363 B1 | * | 2/2018 | ........... B66B 1/3492 |
| JP | 2018193162 A | * | 12/2018 | |
| JP | 6487082 B1 | * | 3/2019 | ............... B66B 1/14 |
| WO | WO 2014/103088 A1 | | 7/2014 | |
| WO | WO-2020026300 A1 | * | 2/2020 | |
| WO | WO-2020090003 A1 | * | 5/2020 | |

OTHER PUBLICATIONS

Office Action dated Oct. 29, 2020 in counterpart Indian Patent Application No. 201947052804 with English Translation.
Chinese Office Action dated Jan. 29, 2021 in counterpart Chinese Application No. 201780092611.5 with an English Translation.

* cited by examiner

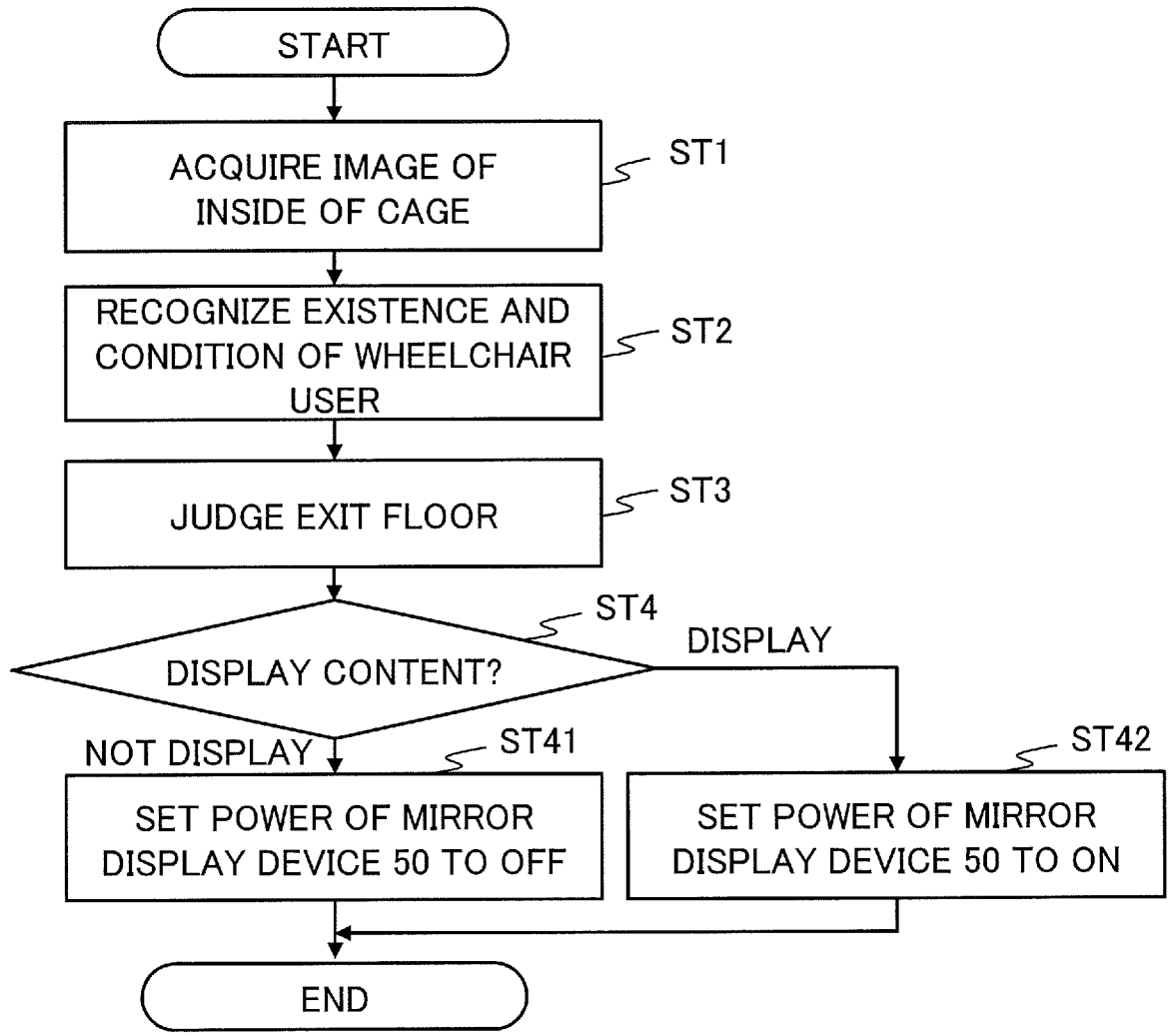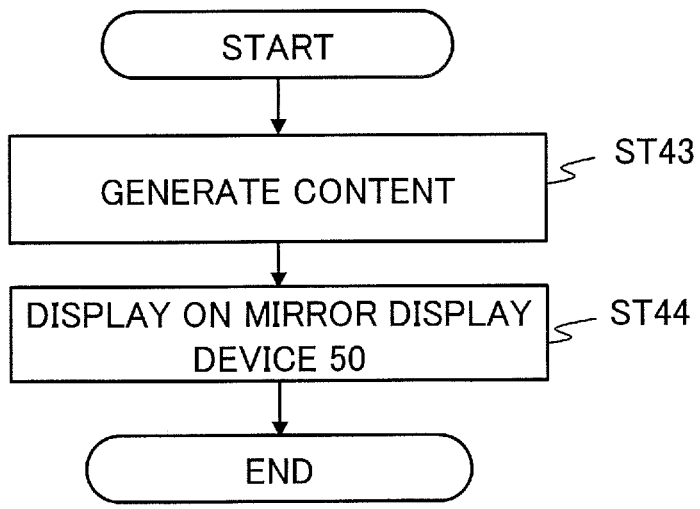

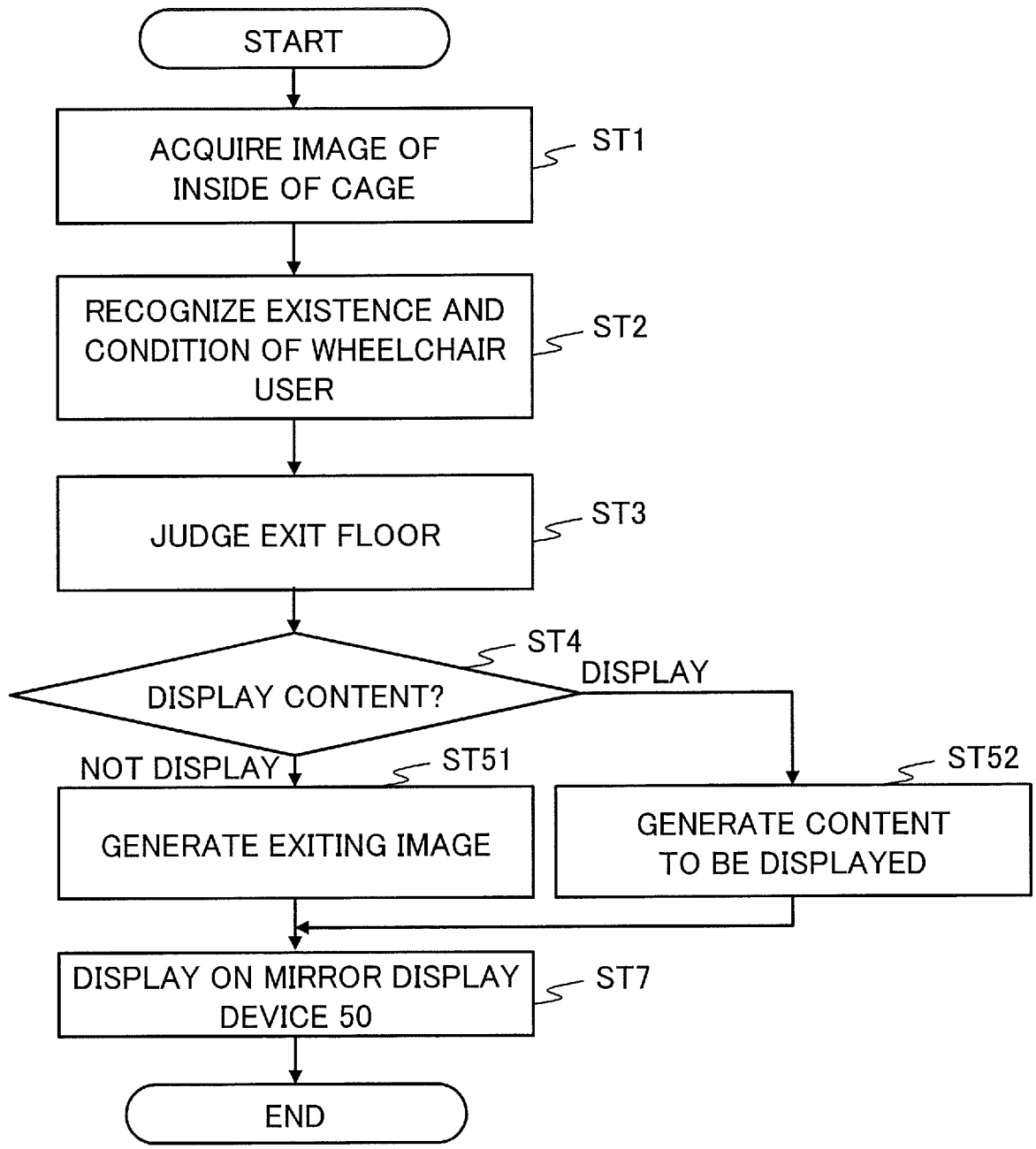

ELEVATOR DISPLAY SYSTEM

TECHNICAL FIELD

The present invention relates to an elevator display system including a display device with a mirror function (mirror display device) having a function as a mirror and a function as an image display unit.

BACKGROUND ART

In an elevator, there are cases where a wheelchair user exits from the cage of the elevator by reversing the wheelchair. In such cases, the wheelchair user reverses the wheelchair while checking the situation to the rear of the wheelchair reflected on a mirror provided on a wall on a side opposite to the elevator door.

However, the eyes of the wheelchair user are situated at a position where the wheelchair user is likely to happen to make eye contact with general passengers via the mirror in the cage, and the mirror for assisting the reversing of the wheelchair can cause mental stress to the wheelchair user.

As a countermeasure against this problem, there has been proposed a device in which a display device with a mirror function, having a function as a mirror and a function as an image display unit (display), is provided in the cage and the mirror function is enabled only for a period from a time just before the elevator door opens to a time when the elevator door closes (see Patent Reference 1, for example).

PRIOR ART REFERENCE

Patent Reference

Patent Reference 1: Japanese Patent Application Publication No. 2005-200203 (paragraph 0005, for example)

SUMMARY OF THE INVENTION

Problem to be Solved by the Invention

However, in the device described in the Patent Reference 1, when the device has been set to a wheelchair operation mode, the mirror function of the display device in the cage is enabled every time the elevator door opens, and thus general users not needing the assistance of the mirror at the times of boarding and exiting can have a feeling of discomfort.

An object of the present invention, which has been made to resolve the above-described problem, is to provide an elevator display system that enables the mirror function only when a wheelchair user needing the mirror function exists in the cage.

Means for Solving the Problem

An elevator display system according to an aspect of the present invention includes: a sensing device that acquires sensing data indicating condition of an inside of a cage of an elevator by photographing or detecting the condition of the inside of the cage; a mirror display device that is arranged in the cage on a side opposite to an elevator door, functions in a first state of being a mirror by displaying an image based on predetermined image data, and functions in a second state of being an image display unit by displaying an image based on display image data other than the predetermined image data; a display image generation unit that generates the display image data to be displayed on the mirror display device; an in-cage condition judgment unit that judges condition of a user in the cage from the sensing data and outputs user information regarding the condition of the user; and a display control unit that outputs a control signal requesting generation of the predetermined image data for setting the display state of a whole or part of a display surface of the mirror display device to the first state or a control signal requesting generation of the display image data for setting the display state to the second state to the display image generation unit based on the user information.

An elevator display system according to another aspect of the present invention includes: a sensing device that acquires sensing data indicating condition of an inside of a cage of an elevator by photographing or detecting the condition of the inside of the cage; a mirror display device that is arranged in the cage on a side opposite to an elevator door, functions in a first state of being a mirror, and functions in a second state of being an image display unit by displaying an image based on display image data; a display image generation unit that generates the display image data to be displayed on the mirror display device; an in-cage condition judgment unit that judges condition of a user in the cage from the sensing data and outputs user information regarding the condition of the user; and a display control unit that outputs a control signal for setting the display state of a whole or part of a display surface of the mirror display device to the first state or a control signal for setting the display state to the second state to the mirror display device based on the user information.

Effect of the Invention

According to the present invention, it is possible to enable the mirror function only when a wheelchair user needing the mirror function exists in the cage, by which an advantage is obtained in that the wheelchair user can be provided with appropriate assistance by the mirror function at the times of boarding and exiting while it is possible to avoid causing the feeling of discomfort to a general user not needing the assistance of the mirror.

BRIEF DESCRIPTION OF THE DRAWINGS

FIG. 10 is a flowchart showing the operation of the elevator display system according to the fourth embodiment.

FIG. 11 is a flowchart showing the operation of a content generation unit and a mirror display device of the elevator display system according to the fourth embodiment.

FIG. 13 is a flowchart showing the operation of the elevator display system according to the fifth embodiment.

MODE FOR CARRYING OUT THE INVENTION

Elevator display systems according to embodiments of the present invention will be described below with reference to the accompanying drawings. The following embodiments are just examples and a variety of modifications are possible within the scope of the present invention.

(1) First Embodiment (1-1) Configuration

Figure 1:
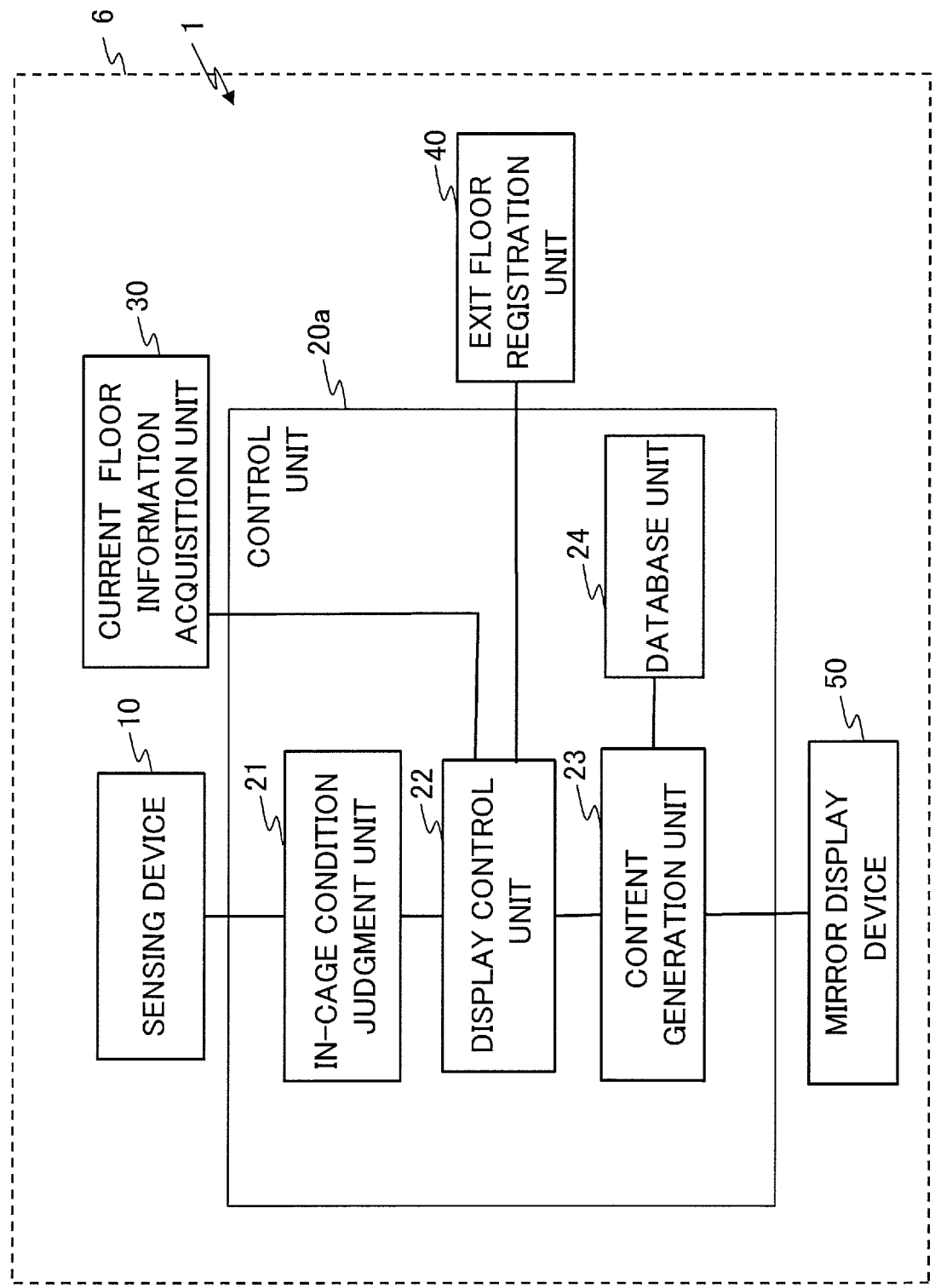
FIG. 1 is a block diagram schematically showing a configuration of an elevator display system according to a first embodiment of the present invention.

FIG. 1 is a block diagram schematically showing a configuration of an elevator display system 1 according to a first embodiment. As shown in FIG. 1, the elevator display system 1 includes a control unit 20a, a sensing device 10, a current floor information acquisition unit 30, an exit floor registration unit 40, and a mirror display device 50 as a display device with a mirror function. The control unit 20a includes an in-cage condition judgment unit 21, a display control unit 22, a content generation unit 23 as a display image generation unit, and a database unit 24.

The sensing device 10 performs sensing of the inside of a cage 6 of the elevator. Specifically, the sensing device 10 includes a video camera (image capturing device) for capturing images of the inside of the cage 6. However, the sensing device 10 may also be configured to include a sensor like a three-dimensional scanner capable of acquiring position information and shape information on objects in the cage 6. The sensing device 10 may also be configured to include both a camera and a sensor.

The in-cage condition judgment unit 21 judges whether or not a wheelchair user exists in the cage 6 and judges whether or not a wheelchair user is facing the mirror display device 50 in a case where a wheelchair user exists in the cage 6, based on sensing data acquired by the sensing device 10, such as image data obtained by the image capture by the video camera, by using an image recognition method for distinguishing between a general pedestrian and a wheelchair user (such as a method by means of machine learning). The reason for judging whether or not a wheelchair user is facing the mirror display device 50 is that if a wheelchair user faces the mirror display device 50, the wheelchair user reverses the wheelchair to exit from the cage 6 while looking in a mirror on a wall on the side opposite to the elevator door to check the rear view. While the timing of the judgment on whether or not a wheelchair user is facing the mirror display device 50 is not particularly limited, it is desirable to make the judgment at the time when the wheelchair user exits from the cage since the wheelchair user in the cage 6 might change the direction of the wheelchair.

The current floor information acquisition unit 30 acquires information indicating the current position of the cage 6 in the elevator shaft (at which floor the cage 6 is situated) from a management device (not shown) or the like of the elevator equipment, for example.

The exit floor registration unit 40 includes an operation unit to which a user inputs (registers) a floor where the user wants to exit from the cage 6 of the elevator. The exit floor registration unit 40 is provided at one or more points in the cage 6. The exit floor registration unit 40 may be provided at a low position to be easily operable by wheelchair users. Further, the exit floor registration unit 40 may be provided with an exit floor registration unit set at an appropriate height which allows general users to easily operate and another exit floor registration unit provided at a low position so that wheelchair users can easily operate. The exit floor registration unit 40 may be separated into a general user exit floor registration unit and a wheelchair user exit floor registration unit and the display control unit 22 may perform control (e.g., control of enabling the function as the mirror) while handling exit floors inputted through the wheelchair user exit floor registration unit only as wheelchair-user exit floors.

The display control unit 22 judges whether or not content is displayed on the mirror display device 50 (i.e., display or non-display of content) based on information indicating whether or not a wheelchair user exists in the cage 6 of the elevator and information indicating whether or not a wheelchair user is facing the mirror display device 50 acquired from the in-cage condition judgment unit 21, current floor information acquired from the current floor information acquisition unit 30, and exit floor information acquired from the exit floor registration unit 40.

The database unit 24 is a storage unit such as a memory and stores content to be displayed on the mirror display device 50, playback timing information indicating playback timing of content determined by associating each event with content (e.g., playback schedule information and information indicating a period in which content is displayed on the mirror display device 50), and so forth. The database unit 24 stores various types of data as the basis of the content to be displayed on the mirror display device 50. The database unit 24 stores content, including materials each being a still image, motion video, a character string, a figure or graphics, for example, and formed of these materials and arrangement information on the materials, and the playback timing information indicating the timing, period, etc. of displaying the content on the mirror display device 50. The playback timing information is information associating each event, as a trigger for displaying content specified based on the time of day, the exit floor, the current floor, or the like, with the content to be played back at the time of occurrence of the event.

The content generation unit 23 receives the judgment result acquired from the display control unit 22 and indicating the display or non-display of content, selects content to be displayed based on the playback timing information acquired from the database unit 24, acquires the selected content from the database unit 24, and generates display image data based on the acquired content.

The mirror display device 50 can be used while selecting an image display state (second state) in which the mirror display device 50 displays an image based on the content as the display image data generated by the content generation unit 23 or a state (first state) in which the mirror display device 50 displays an image based on predetermined image data, thereby functioning as a mirror. The mirror display device 50 has structure formed by arranging half mirror glass in superimposition on a front surface of a common type of display panel such as a liquid crystal display, for example. In the mirror display device 50 having such structure, when the image based on the predetermined image data (e.g., image filled in with black color) is displayed on the display panel (in the first state), the half mirror functions as a mirror. In the state of displaying the image based on the content on the display panel (the second state), the image becomes visible through the half mirror.

In the elevator display system 1, the sensing device 10 obtains the sensing data indicating the condition in the cage 6 of the elevator by photographing or detecting the condition in the cage, and the in-cage condition judgment unit 21 judges the condition of the user in the cage 6 from the sensing data and outputs user information regarding the condition of the user. The content generation unit 23 as the display image generation unit generates the display image data (content) to be displayed on the mirror display device 50. Based on the user information, the display control unit 22 outputs a control signal requesting the generation of the predetermined image data for setting the display state of the whole or part of a display surface of the mirror display device 50 to the first state or a control signal requesting the generation of the display image data for setting the display state to the second state to the content generation unit 23. The mirror display device 50 functions in the first state of being a mirror by displaying an image based on the predetermined image data, and functions in the second state of being an image display unit by displaying an image based on the display image data other than the predetermined image data.

Incidentally, the configuration shown in FIG. 1 is just an example and the present invention is not limited to the configuration. For example, the in-cage condition judgment unit 21 may be provided inside the sensing device 10. Further, while FIG. 1 shows a case where the components are provided in the cage 6 of the elevator, it is also possible to provide part of the components (e.g., the control unit 20*a*) in the elevator management device provided outside the cage 6.

Figure 2:
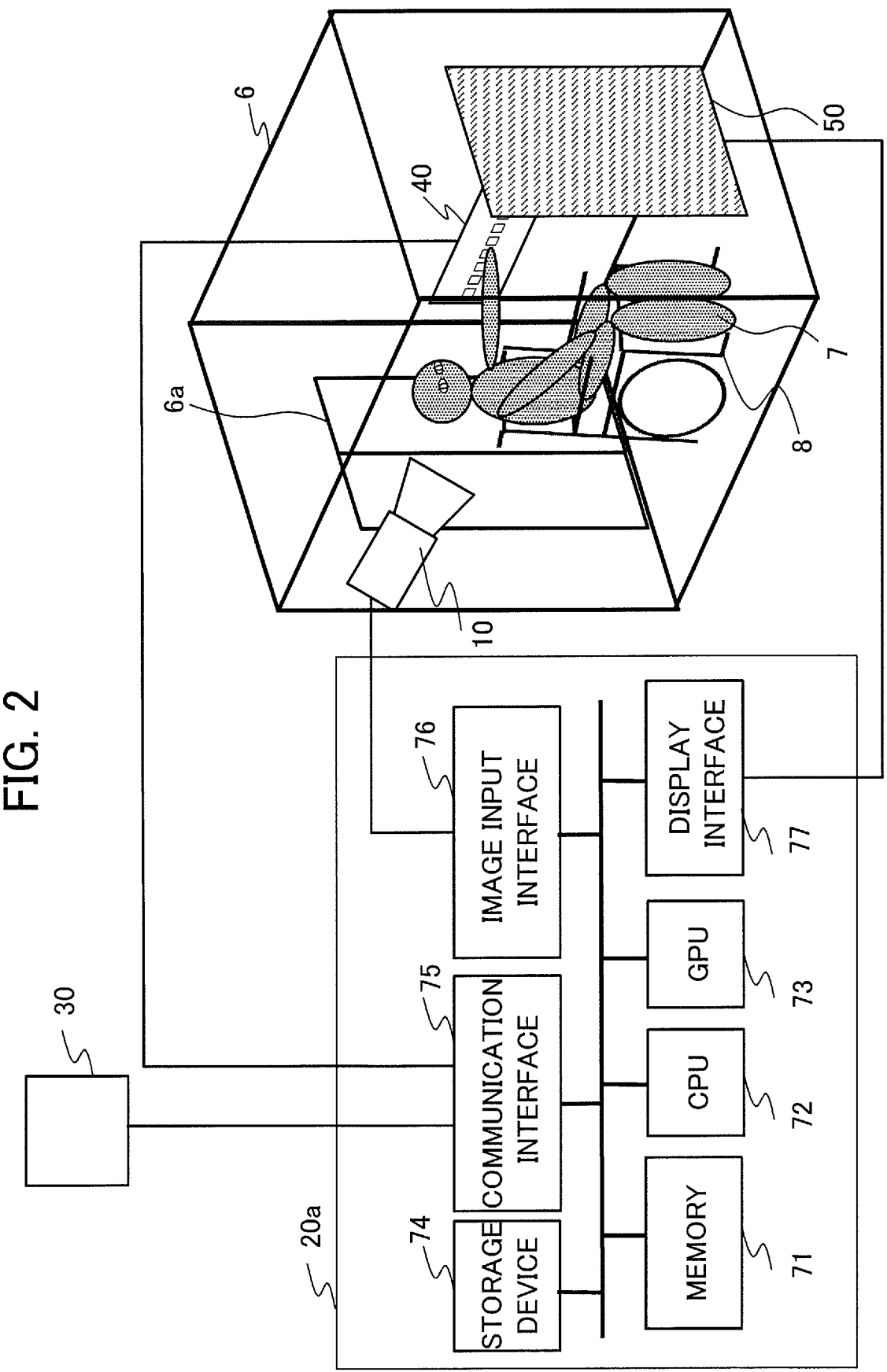
FIG. 2 is a diagram showing a hardware configuration of the elevator display system according to the first embodiment.

FIG. 2 is a diagram showing a hardware configuration of the elevator display system 1 according to the first embodiment.

As shown in FIG. 2, the cage 6 of the elevator is a box-like structure in a rectangular prism shape in which a user rides. The control unit 20*a* includes a memory 71 as a storage unit for storing a program, a CPU (Central Processing Unit) 72 as a processor, a GPU (Graphics Processing Unit) 73 as a graphics processor, a storage device 74, a communication interface 75, an image input interface 76, and a display interface 77. The control unit 20*a* shown in FIG. 2 is implemented by the CPU 72 by executing the program stored in the memory 71. Parenthetically, FIG. 2 shows a state in which a wheelchair user 7 seated on a wheelchair 8 is on board the cage while facing the mirror display device 50.

Incidentally, the configuration shown in FIG. 2 is an example and the present invention is not limited to the configuration. For example, part of the functions of the control unit 20*a* may be implemented by a dedicated processor. Further, the CPU 72 may serve also as the GPU 73. Furthermore, the memory 71 may be a storage unit separate from a video memory. In a case where encoded image data supplied from the sensing device 10 is received by the communication interface 75, there is no need to provide the image input interface 76. In the case where the in-cage condition judgment unit 21 is provided inside the sensing device 10, the result of the judgment by the in-cage condition judgment unit 21 may be received by the communication interface 75. Communication with the current floor information acquisition unit 30 and the exit floor registration unit 40 may be carried out via a dedicated input interface (not shown).

(1-2) Operation

Figure 3:
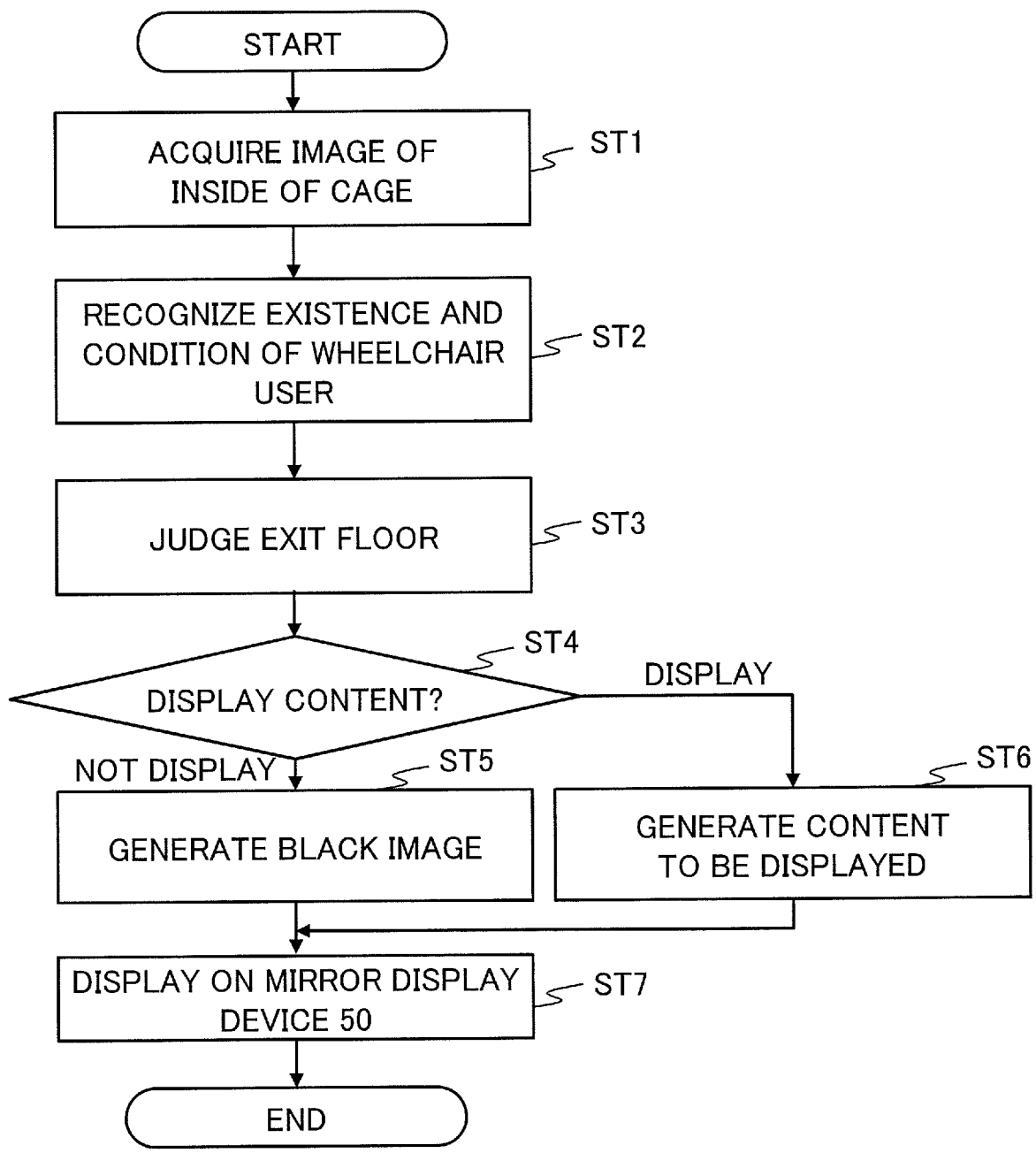
FIG. 3 is a flowchart showing the operation of the elevator display system according to the first embodiment.

FIG. 3 is a flowchart showing the operation of the elevator display system 1 according to the first embodiment.

In step ST1, the sensing device 10 including the video camera acquires images of the inside of the cage 6.

In the next step ST2, the in-cage condition judgment unit 21 of the control unit 20*a* judges whether a wheelchair user exists or not from the images of the inside of the cage 6, and when a wheelchair user exists, judges in which direction the wheelchair user is facing in the cage 6 (e.g., whether the wheelchair user is facing the mirror display device 50 or not). When a plurality of wheelchair users exists in the cage 6, the in-cage condition judgment unit 21 judges in which direction each wheelchair user is facing in the cage 6.

In the next step ST3, the display control unit 22 of the control unit 20*a* compares the current floor information acquired from the current floor information acquisition unit 30 with the exit floor information acquired from the exit floor registration unit 40, and judges that the cage 6 has arrived at the exit floor if the current floor coincides with the exit floor.

In the next step ST4, the display control unit 22 judges whether or not the content is displayed (i.e., the content is set to a display state) or is not be displayed (i.e., the content is set to a non-display state) based on judgment result information obtained in the step ST2 and indicating whether or not there is/are a wheelchair user/wheelchair users and whether or not the wheelchair user/users is/are facing the mirror display device 50 and exit floor arrival judgment information obtained in the step ST3. Details of the judgment process in the step ST4 will be described later with reference to FIG. 4. The "display state" mentioned here means a state in which the content is displayed, that is, a state in which an image based on the display image data (content) other than the predetermined image data is displayed. The "non-display state" mentioned here means a state in which the content is not displayed, that is, a state in which an image based on the predetermined image data (e.g., image filled in with black color) is displayed and thus the mirror display device 50 functions as the mirror.

When it is judged in the step ST4 that the content is set to the non-display state, the process advances to step ST5. In the step ST5, the content generation unit 23 generates image data for displaying an image filled in with black color as the display image data. When the image filled in with black color is displayed by the mirror display device 50, the mirror function can be fully exhibited since the user can view a reflected image reflected on the display surface of the mirror display device 50 without being disturbed by the display image on the display. Incidentally, the black color may also be a particular color other than black.

When it is judged in the step ST4 that the content is displayed, the process advances to step ST6. In the step ST6, the content generation unit 23 acquires display image data of display content determined based on the playback schedule information acquired from the database unit 24, from the database unit 24, and generates the content to be displayed by using the display image data.

In the next step ST7, the mirror display device 50 displays the black image or the content generated in the step ST5 or ST6.

Incidentally, the details and the procedure of the processing shown in FIG. 1 are an example and the present invention is not limited to the processing shown in FIG. 1.

For example, the processing of the steps ST1 and ST2, the processing of the step ST3, and the processing of the steps ST4 to ST7 may be performed periodically with timings independent of each other.

Further, in the step ST5, it is also possible to implement the use of the mirror function by the exiting wheelchair user and the display of the content at the same time, not by filling in the whole screen with black color but by displaying the display image of the display content similarly to the step ST6 while exclusively filling in a partial region used by the exiting wheelchair user with black color. Furthermore, while a case where the black image is displayed to enable the mirror function has been described in the first embodiment, the color for enabling the mirror function is not limited to black; it is also possible to fill in the screen with a color other than black.

Figure 4:
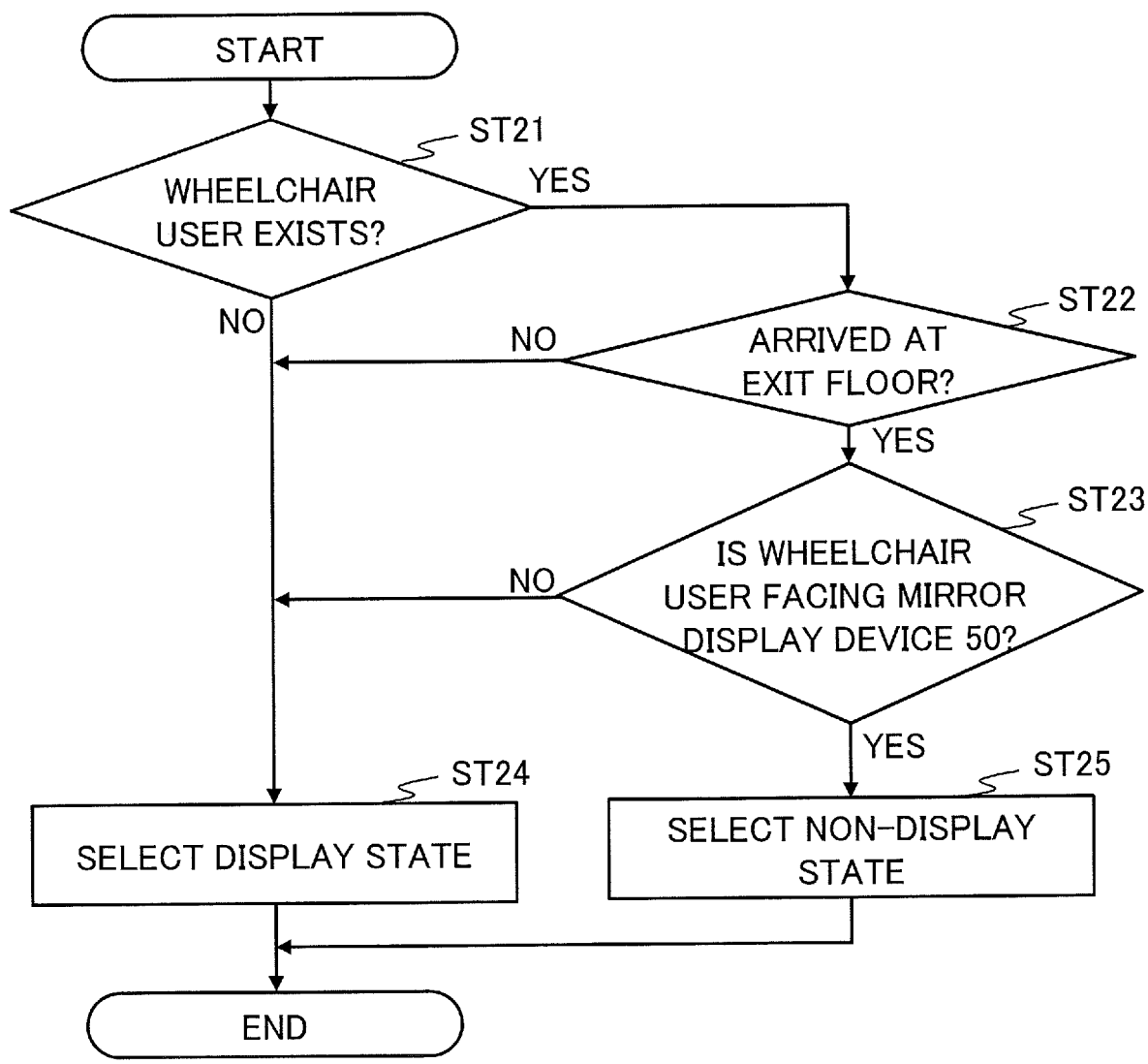
FIG. 4 is a flowchart showing an example of a judgment process in step ST4 in FIG. 3.

FIG. 4 is a flowchart showing an example of the judgment process in the step ST4 in FIG. 3.

In step ST21, the display control unit 22 judges whether a wheelchair user exists in the cage 6 or not based on the result of the step ST2 in FIG. 3. The process advances to step ST22 when a wheelchair user exists (YES in the step ST21), or to step ST24 when no wheelchair user exists (NO in the step ST21).

In the step ST22, the display control unit 22 judges whether the cage 6 of the elevator has arrived at the exit floor or not based on the result of the step ST3 in FIG. 3. The process advances to step ST24 when the cage 6 has not arrived at the exit floor (NO in the step ST22), or to step ST23 when the cage 6 has arrived at the exit floor (YES in the step ST22).

In step ST23, the display control unit 22 judges whether the wheelchair user is facing the mirror display device 50 or not based on the result of the step ST2 in FIG. 3. The process advances to step ST25 when the wheelchair user is facing the mirror display device 50 (YES in the step ST23), or to the step ST24 when the wheelchair user is not facing the mirror display device 50 (NO in the step ST23).

When the process advances to the step ST24, the display control unit 22 determines to select the display state in which the content is displayed, and advances the process to the step ST6 in FIG. 3.

When the process advances to the step ST25, the display control unit 22 determines to select the non-display state in which the content is not displayed, and advances the process to the step ST5 in FIG. 3. Incidentally, in the case where a wheelchair user exists in the cage 6 and the wheelchair user is facing the mirror display device 50, it is also possible to set the mirror display device 50 to the non-display state (first state) at least for a period in which the elevator door 6a is open. Thus, the judgment on whether the content is displayed or not is completed.

Incidentally, the order of processing of the steps ST21 to ST23 is not limited to the example of FIG. 4.

(1-3) Effect

As described above, with the elevator display system 1 according to the first embodiment, it is possible to enable the mirror function of the mirror display device 50 only when a wheelchair user needing the mirror function exists in the cage 6, which makes it possible to provide the wheelchair user with appropriate assistance by the mirror function at the times of boarding and exiting while avoiding causing the feeling of discomfort to a general user not needing the assistance of the mirror. In other words, with the elevator display system 1 according to the first embodiment, it is possible to recognize the condition of a wheelchair user in the cage 6 of the elevator and to display an image based on content on the mirror display device 50 even when a wheelchair user exists in the cage 6, and when the wheelchair user exits from the cage (when the wheelchair user wants to use a mirror), the wheelchair user can reverse the wheelchair while checking the rear view by using the mirror function in the same way as an ordinary mirror.

(1-4) Modification

While the content generated by the content generation unit 23 in the above description is data generated based on data stored in the database unit 24, the content generated by the content generation unit 23 may include the floor information acquired from the current floor information acquisition unit 30 or video camera images from the sensing device 10.

(2) Second Embodiment (2-1) Configuration

Figure 5:
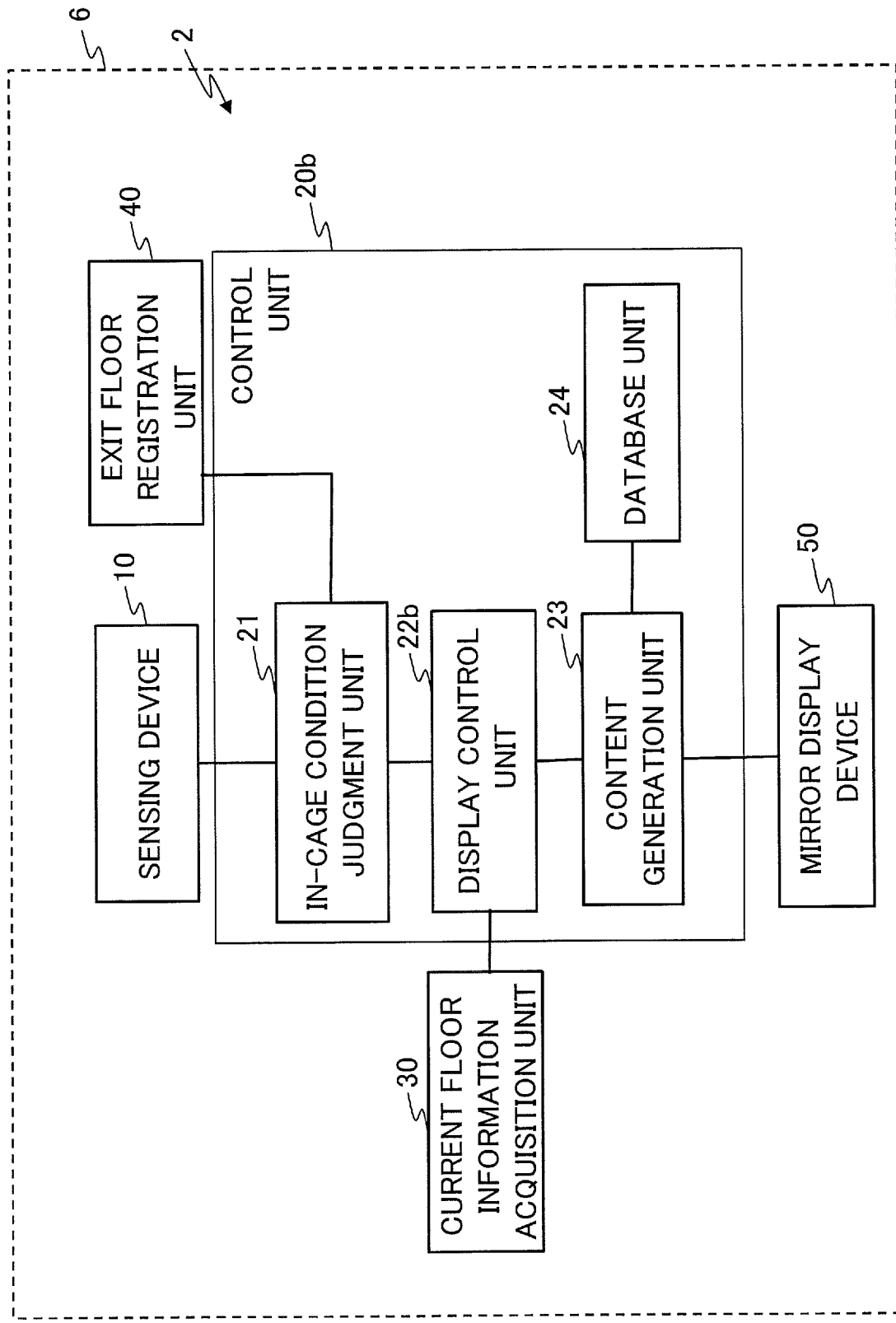
FIG. 5 is a block diagram schematically showing a configuration of an elevator display system according to a second embodiment of the present invention.

FIG. 5 is a block diagram schematically showing a configuration of an elevator display system 2 according to a second embodiment. In FIG. 5, each component identical or corresponding to a component shown in FIG. 1 is assigned the same reference character as in FIG. 1.

The elevator display system 2 according to the second embodiment differs from the elevator display system 1 according to the first embodiment in that a wheelchair user who exits from the cage at a stopping floor is made recognizable by storing (e.g., storing in the memory 71 in FIG. 2) identification information on (identification number of) the wheelchair user on board the cage 6 of the elevator and the exit floor registered with the exit floor registration unit 40 by the wheelchair user while associating them with each other, and the mirror function of the mirror display device 50 is enabled only when the wheelchair user exits from the cage by using the mirror. Thus, in the elevator display system 2 according to the second embodiment, the exit floor registration unit 40 supplies exit floor information to a display control unit 22b of a control unit 20b. Except for these features, the configuration in the second embodiment is the same as that in the first embodiment. Therefore, FIG. 2 to FIG. 4 will also be referred to in the following description of the second embodiment.

(2-2) Operation

Except for the processing of the step ST2 shown in FIG. 3, the operation of the elevator display system 2 according to the second embodiment is the same as that in the first embodiment shown in FIG. 3. In the elevator display system 2 according to the second embodiment, in the step ST2, the in-cage condition judgment unit 21 judges whether or not there is a wheelchair user and whether or not a wheelchair user is in a posture of facing the mirror display device 50, that is, whether or not a wheelchair user has entered the cage 6 through the elevator door 6a while facing forward and is boarding while facing the same direction. Further, in the step ST2, the in-cage condition judgment unit 21 recognizes that the wheelchair user has registered the exit floor with the exit floor registration unit 40 and associates the exit floor information with information indicating the direction the wheelchair user is facing. In regard to these features, the operation in the second embodiment differs from that in the first embodiment.

Further, while the details of the processing of the step ST4 in the second embodiment are basically the same as those shown in FIG. 4, the processing of the step ST4 in the second embodiment differs from that in the first embodiment in that the wheelchair user as the target of the judgment in the step ST23 is limited to a wheelchair user who exits from the cage at the current floor.

(2-3) Effect

As described above, with the elevator display system 2 according to the second embodiment, it is possible to enable the mirror function of the mirror display device 50 only when a wheelchair user needing the mirror function exists in the cage 6, which makes it possible to provide the wheelchair user with appropriate assistance by the mirror function at the times of boarding and exiting while avoiding causing the feeling of discomfort to a general user not needing the assistance of the mirror. Specifically, with the elevator display system 2 according to the second embodiment, the condition of a wheelchair user in the cage 6 of the elevator is recognized and the result of the recognition is stored while being associated with the wheelchair user, and thus the mirror function of the mirror display device 50 can be enabled when the wheelchair user exits from the cage although the content is displayed on the mirror display device 50 when the wheelchair user is on board. Namely, when a wheelchair user is on board the cage 6, the mirror display device 50 in the first embodiment enables the mirror function even at stopping floors other than the exit floor where the wheelchair user exits from the cage, whereas the mirror display device 50 in the second embodiment enables the mirror function only at the exit floor of the wheelchair user, by which the feeling of discomfort caused to a general user not needing the assistance of the mirror can be reduced further.

(3) Third Embodiment (3-1) Configuration

Figure 6:
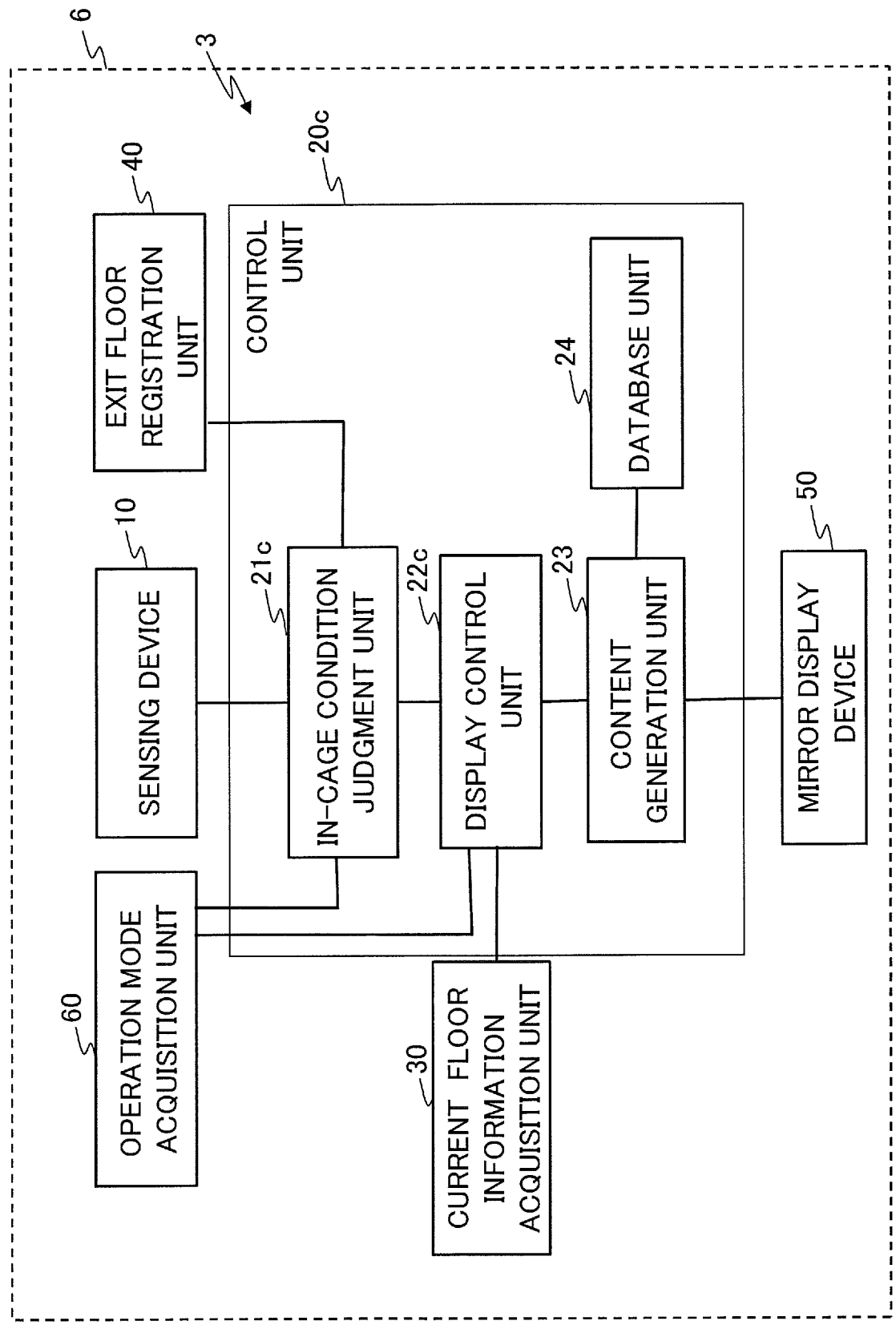
FIG. 6 is a block diagram schematically showing a configuration of an elevator display system according to a third embodiment of the present invention.

FIG. 6 is a block diagram schematically showing a configuration of an elevator display system 3 according to a third embodiment. In FIG. 6, each component identical or corresponding to a component shown in FIG. 5 is assigned the same reference character as in FIG. 5.

The elevator display system 3 according to the third embodiment differs from the elevator display system 2 according to the second embodiment in that the judgment process on the condition inside the cage 6 of the elevator and the judgment process on whether the content is displayed or not are performed only when elevator operation condition is a wheelchair operation mode. However, such processing in which the judgment process on the condition inside the cage 6 of the elevator and the judgment process on whether the content is displayed or not are performed only when the elevator operation condition is the wheelchair operation mode is applicable also to other embodiments.

An operation mode acquisition unit 60 acquires operation mode information on the elevator and supplies the operation mode information to an in-cage condition judgment unit 21c and a display control unit 22c of a control unit 20c. The display control unit 22c judges whether the content is displayed or not based on the associated combination of the direction of the wheelchair user and the exit floor information acquired from the in-cage condition judgment unit 21 and the operation mode information acquired from the operation mode acquisition unit 60. Except for these features, the configuration in the third embodiment is the same as that in the first or second embodiment. Therefore, FIG. 2 will also be referred to in the following description of the third embodiment.

(3-2) Operation

Figure 7:
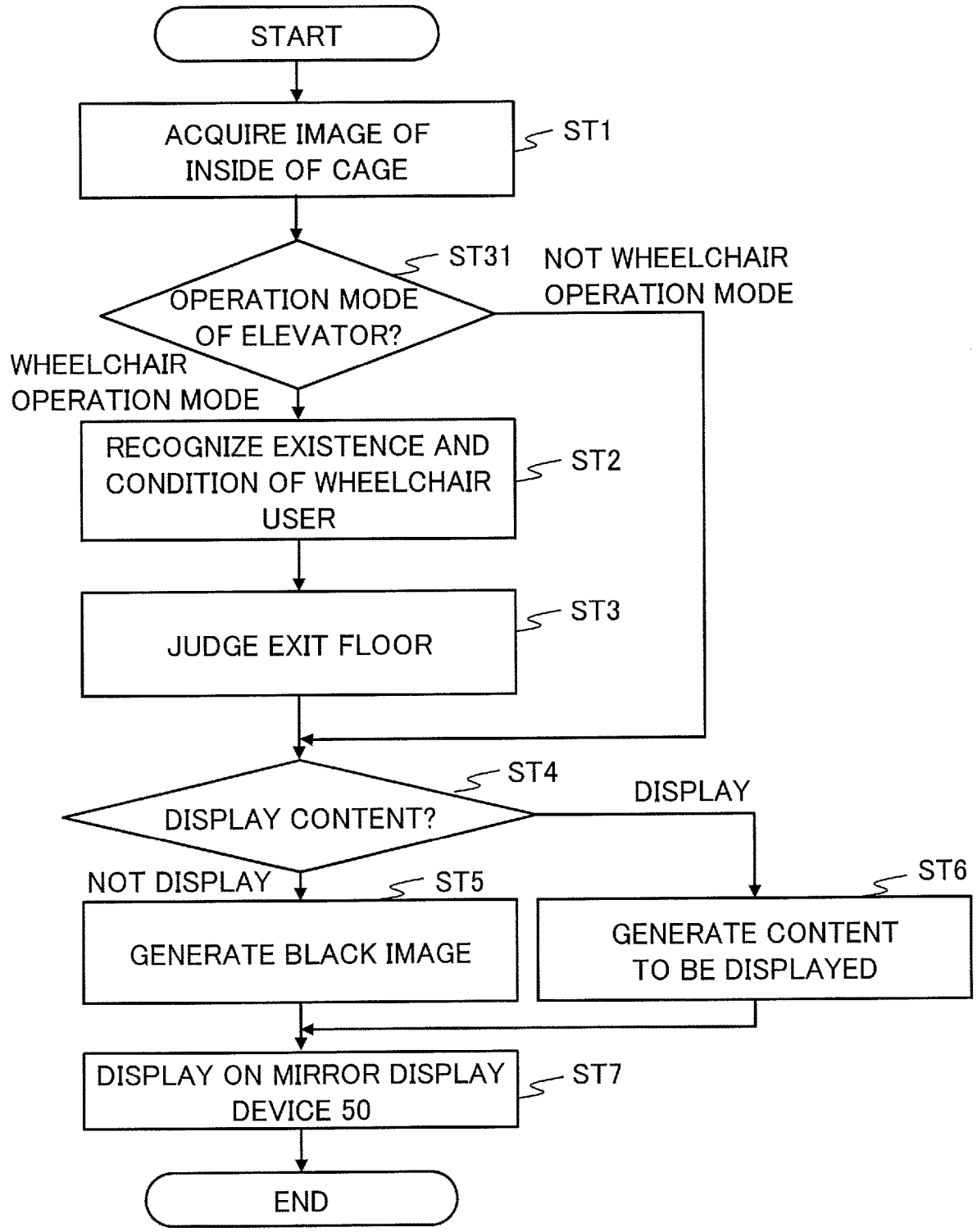
FIG. 7 is a flowchart showing the operation of the elevator display system according to the third embodiment.

FIG. 7 is a flowchart showing the operation of the elevator display system 3 according to the third embodiment. In FIG. 7, each process step identical or corresponding to a process step shown in FIG. 3 is assigned the same reference character as in FIG. 3.

In step ST31 in FIG. 7, whether the operation mode is the wheelchair operation mode or not is judged based on the operation mode information supplied from the operation mode acquisition unit 60. The process advances to the step ST2 when the operation mode is the wheelchair operation mode, or to the step ST4 when the operation mode is not the wheelchair operation mode (when the operation mode is a normal operation mode or an absence mode).

The normal operation mode is an operation mode in a case where no wheelchair user is on board the cage 6. In the third embodiment, the exit floor registration unit 40 includes a first exit floor registration unit arranged at a high position for general users and a second exit floor registration unit arranged at a low position for wheelchair users, and the operation mode is judged to be the wheelchair operation mode when an exit floor is registered through the second exit floor registration unit, or judged to be the normal operation mode when an exit floor is registered through the first exit floor registration unit.

The absence mode is a mode to which the operation mode shifts when there is no user in the cage 6. For example, the absence mode is a mode to which the operation mode shifts when no setting of the exit floor is registered within a certain time after the elevator door 6a closes.

Figure 8:
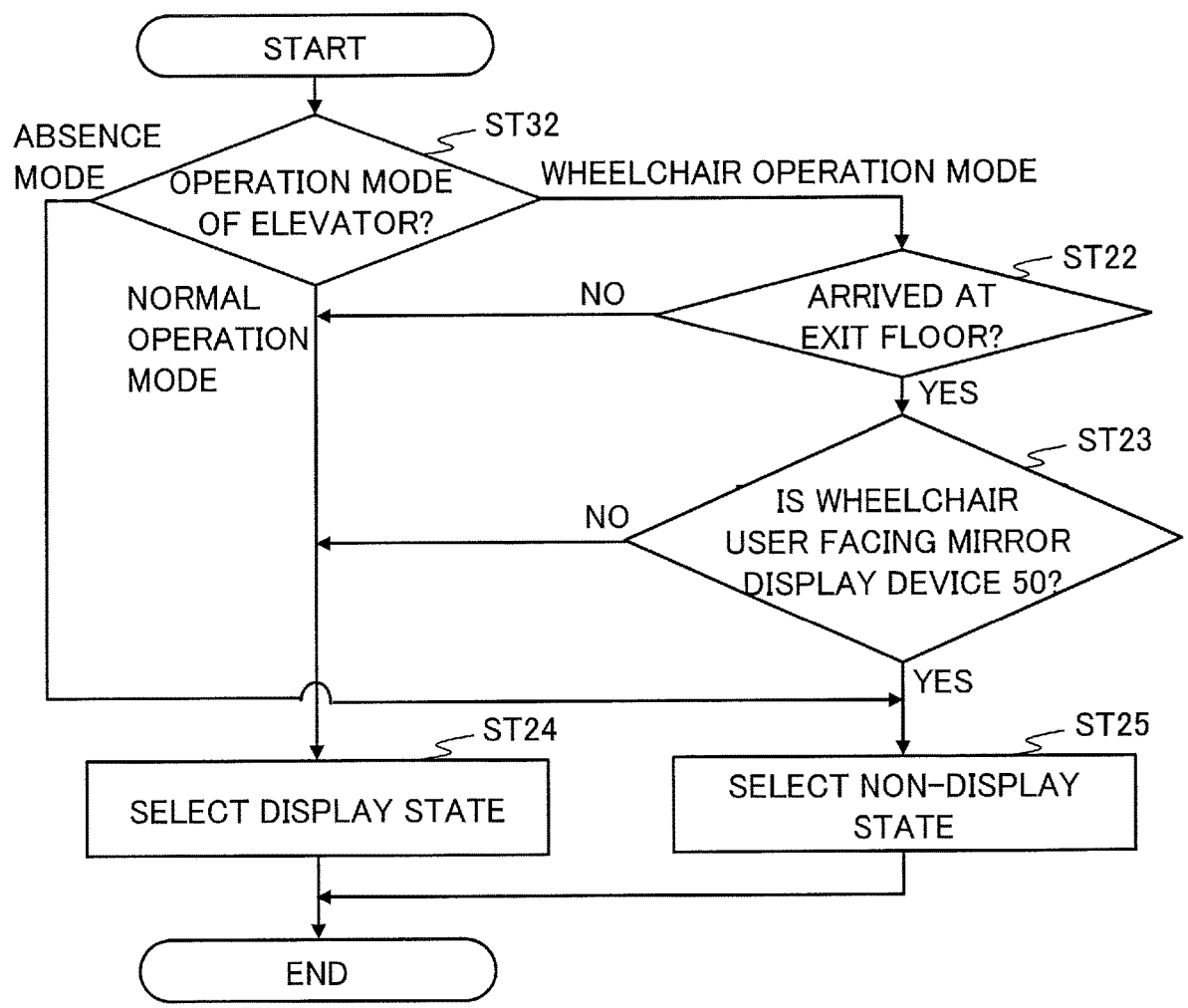
FIG. 8 is a flowchart showing an example of the judgment process in the step ST4 in FIG. 7.

FIG. 8 is a flowchart showing an example of the judgment process in the step ST4 in FIG. 7. In FIG. 8, each process step identical or corresponding to a process step shown in FIG. 4 is assigned the same reference character as in FIG. 4. In step ST32 in FIG. 8, the operation mode of the elevator is judged. When the operation mode is the normal operation mode, the elevator is in a condition in which only one or more users not being a wheelchair user exist in the cage 6, and thus the process advances to the step ST24 and the mirror display device 50 is set to the content display state. When the operation mode is the absence mode, the elevator is in a condition in which no user exists in the cage 6, and thus the process advances to the step ST25 and the mirror display device 50 is set to the non-display state. When the operation mode is the wheelchair operation mode, the process advances to the step ST22 in the same way as in the first and second embodiments. The processing in the steps ST22 to ST25 is the same as that in FIG. 4.

(3-3) Effect

As described above, with the elevator display system 3 according to the third embodiment, it is possible to enable the mirror function of the mirror display device 50 only when a wheelchair user needing the mirror function exists in the cage 6, which makes it possible to provide the wheelchair user with appropriate assistance by the mirror function at the times of boarding and exiting while avoiding causing the feeling of discomfort to a general user not needing the assistance of the mirror. Specifically, with the elevator display system 3 according to the third embodiment, the operation mode information on the elevator is added to the information used for the judgment on whether the content is displayed or not, and thus the judgment regarding the display state or the non-display state can be made more efficiently and information processing workload on the control unit 20c can be reduced.

(4) Fourth Embodiment

(4-1) Configuration

Figure 9:
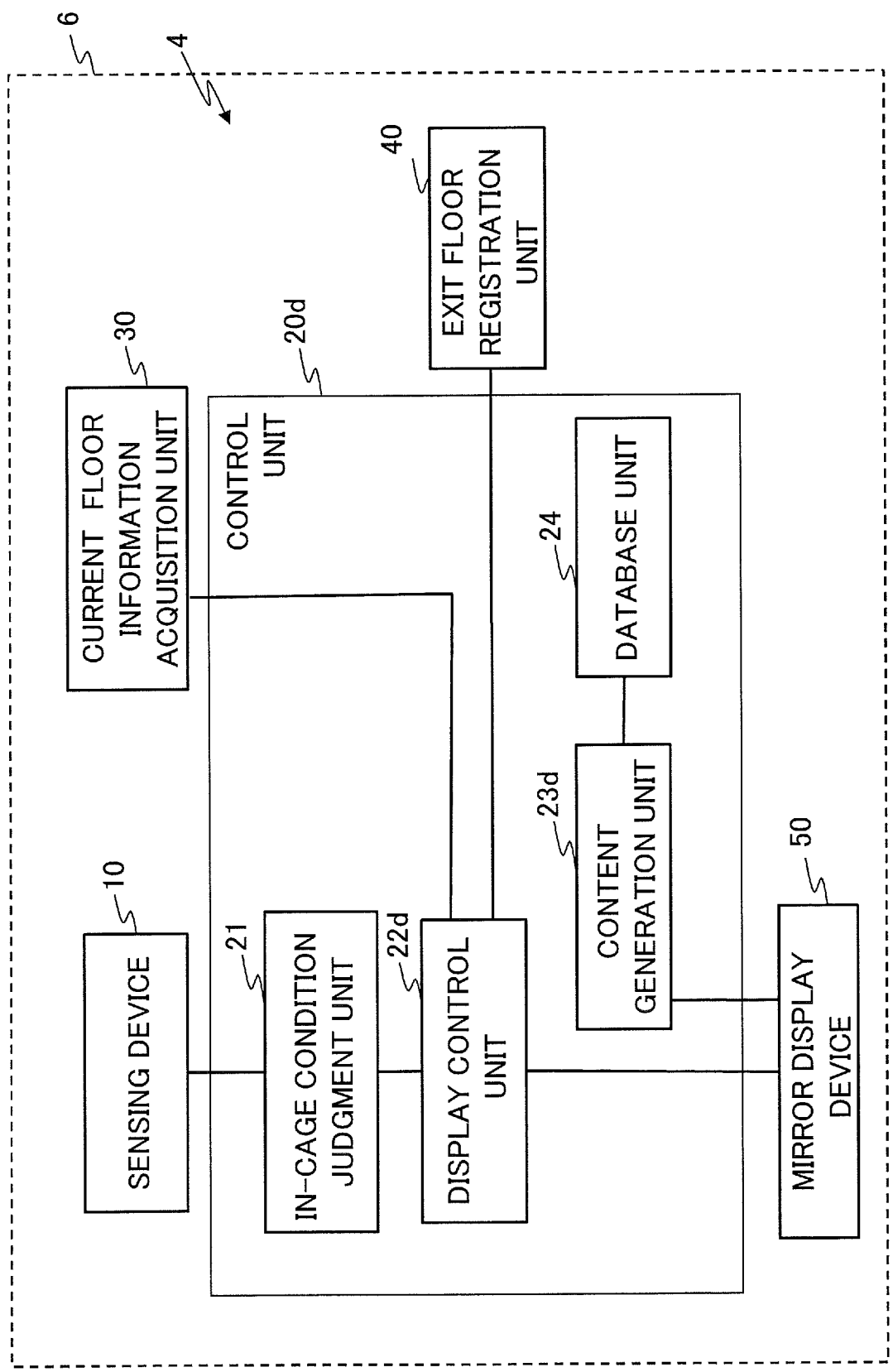
FIG. 9 is a block diagram schematically showing a configuration of an elevator display system according to a fourth embodiment of the present invention.

FIG. 9 is a block diagram schematically showing a configuration of an elevator display system 4 according to a fourth embodiment. In FIG. 9, each component identical or corresponding to a component shown in FIG. 1 is assigned the same reference character as in FIG. 1.

The elevator display system 4 according to the fourth embodiment differs from the elevator display system 1 according to the first embodiment in not changing the display content but setting the power of the mirror display device 50 to on or off according to the result of the judgment process on whether the content is displayed or not. Namely, the mirror display device 50 is arranged in the cage 6 on the side opposite to the elevator door, functions in the first state of being a mirror (power-off state), and functions in the second state of being the image display unit (power-on state) by displaying an image based on the display image data.

Further, in the fourth embodiment, a display control unit 22d of a control unit 20d directly controls the mirror display device 50 while a content generation unit 23d as the display image generation unit controls the mirror display device 50 independently of the display control unit 22d. Specifically, the display control unit 22d outputs a control signal for setting the display state of the whole or part of the display surface of the mirror display device 50 to the first state or a control signal for setting the display state to the second state to the mirror display device 50 based on the user information.

(4-2) Operation

FIG. 10 is a flowchart showing the operation of the elevator display system 4 according to the fourth embodiment. In FIG. 10, each process step identical or corresponding to a process step shown in FIG. 3 is assigned the same reference character as in FIG. 3. FIG. 11 is a flowchart showing the operation of the content generation unit 23d and the mirror display device 50 of the elevator display system 4 according to the fourth embodiment.

As shown in FIG. 10, in the elevator display system 4 according to the fourth embodiment, after the judgment in the step ST4 on whether the content is displayed or not, the power of the mirror display device 50 is set to off (step ST41) when the content is not displayed, or set to on (step ST42) when the content is displayed.

Further, as shown in FIG. 11, the content generation process (step ST43) by the content generation unit 23d and the display process (step ST44) by the mirror display device 50 are performed independently of the processing of the steps ST1 to ST4, ST41 and ST42 shown in FIG. 10, and thus it is possible to continue generating the display images periodically.

(4-3) Effect

As described above, with the elevator display system 4 according to the fourth embodiment, it is possible to turn off the power of the mirror display device 50 and thereby enable the mirror function only when a wheelchair user needing the mirror function exists in the cage 6, which makes it possible to provide the wheelchair user with appropriate assistance by the mirror function at the times of boarding and exiting while avoiding causing the feeling of discomfort to a general user not needing the assistance of the mirror. Specifically, with the elevator display system 4 according to the fourth embodiment, the power of the mirror display device 50 is set to on or off according to the result of the judgment on whether the content is displayed or not. Since the content generation unit 23d is not influenced by the process of setting the content to the display state or the non-display state, the processing performed by the content generation unit 23d can be simplified.

(4-4) Modification

While the content generation unit 23d and the database unit 24 are arranged in the same control unit 20d as the in-cage condition judgment unit 21 and the display control unit 22d in the fourth embodiment, it is also possible to configure the control unit 20d separately as a first control unit including the content generation unit 23d and the database unit 24 and a second control unit including the in-cage condition judgment unit 21 and the display control unit 22d.

Further, since the fourth embodiment is configured so that the display control unit 22d directly controls the mirror display device 50 differently from the second and third embodiments, the functions of the second or third embodiment can be added to the elevator display system 4 according to the fourth embodiment.

(5) Fifth Embodiment

(5-1) Configuration

Figure 12:
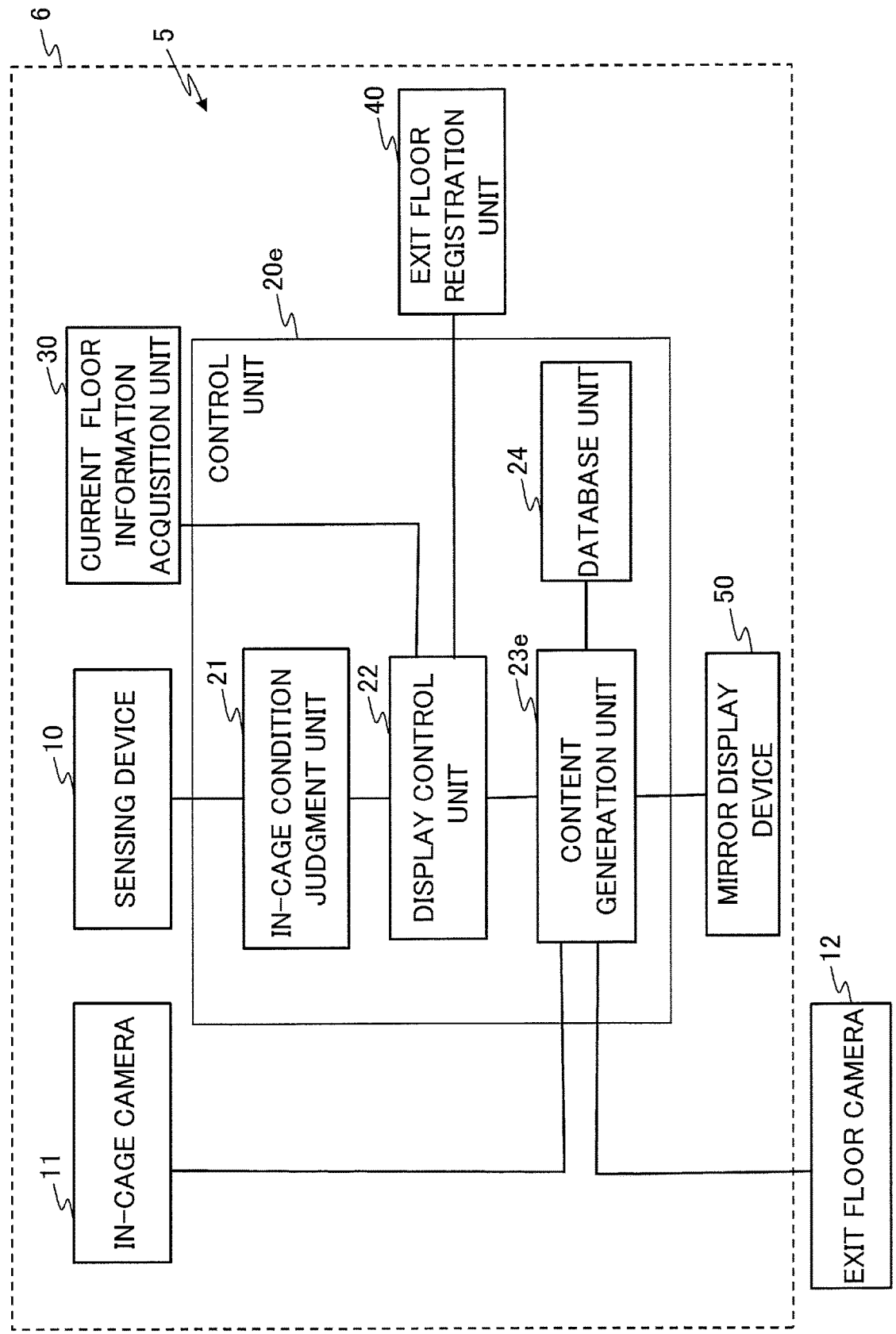
FIG. 12 is a block diagram schematically showing a configuration of an elevator display system according to a fifth embodiment of the present invention.

FIG. 12 is a block diagram schematically showing a configuration of an elevator display system 5 according to a fifth embodiment. In FIG. 12, each component identical or corresponding to a component shown in FIG. 1 is assigned the same reference character as in FIG. 1.

The elevator display system 5 according to the fifth embodiment differs from the elevator display system 1 according to the first embodiment in including an exit floor camera 12 provided at an elevator boarding point and an in-cage camera 11 provided in an upper part of the inside of the cage 6. Incidentally, it is also possible to employ a configuration including either the exit floor camera 12 or the in-cage camera 11. Further, there may be a plurality of exit floor cameras 12. Furthermore, there may be a plurality of in-cage cameras 11.

In the fifth embodiment, a content generation unit 23e as the display image generation unit in a control unit 20e is capable of displaying an image of the elevator boarding point acquired by the exit floor camera 12 and an image of the inside of the cage 6 acquired by the in-cage camera 11 as a piece of content.

(5-2) Operation

FIG. 13 is a flowchart showing the operation of the elevator display system 5 according to the fifth embodiment. In FIG. 13, each process step identical or corresponding to a process step shown in FIG. 3 is assigned the same reference character as in FIG. 3.

In the fifth embodiment, when the content is set to the non-display state in the step ST4, the process advances to step ST51 and the content generation unit 23e generates exiting content. This exiting content includes, for example, a display image of content in which a black image is arranged only in a lower area of the display surface used by the wheelchair user at the time of exiting and an image of the wheelchair user's rear view (image captured by the in-cage camera 11) and an image of the outside of the elevator door 6a (image captured by the exit floor camera 12) are arranged in an upper area of the display surface.

(5-3) Effect

As described above, with the elevator display system 5 according to the fifth embodiment, it is possible to enable the mirror function of the mirror display device 50 only when a wheelchair user needing the mirror function exists in the cage 6, which makes it possible to provide the wheelchair user with appropriate assistance by the mirror function at the times of boarding and exiting while avoiding causing the feeling of discomfort to a general user not needing the assistance of the mirror. Specifically, with the elevator display system 5 according to the fifth embodiment, when the wheelchair user reverses the wheelchair to exit from the cage 6, the wheelchair user can also check the image of the rear view and the image of the outside of the elevator door 6a that the wheelchair user wants to check, while the elevator display system 5 maintains the function as the mirror with which the wheelchair user checks the rear view by use of the mirror display device 50. Accordingly, it is possible to improve a feeling of safety that the wheelchair user feels when the wheelchair user reverses the wheelchair to exit from the cage 6.

DESCRIPTION OF REFERENCE CHARACTERS 1-5: elevator display system, 6: cage of elevator, 6a: elevator door, 7: wheelchair user, 8: wheelchair, 10: sensing device, 11: in-cage camera, 12: exit floor camera, 20a-20e: control unit, 21, 21c: in-cage condition judgment unit, 22, 22b-22d: display control unit, 23, 23d, 23e: content generation unit (display image generation unit), 24: database unit, 30: current floor information acquisition unit, 40: exit floor registration unit, 50: mirror display device.

What is claimed is:

1. An elevator display system comprising:
   a sensor to acquire sensing data indicating condition of an inside of a cage of an elevator by photographing or detecting the condition of the inside of the cage;
   a mirror display arranged in the cage on a side opposite to an elevator door, the mirror display functioning in a first state of being a mirror by displaying an image based on predetermined image data and functioning in a second state of being an image display by displaying an image based on display image data other than the predetermined image data;
   a processor to execute a program; and
   a memory to store the program which, when executed by the processor, performs
   a display image generation process of generating the display image data to be displayed on the mirror display;
   an in-cage condition judgment process of judging condition of a user in the cage from the sensing data and outputting user information regarding the condition of the user;
   a display control process of outputting a control signal requesting generation of the predetermined image data for setting a display state of a whole or part of a display surface of the mirror display to the first state or a control signal requesting generation of the display image data for setting the display state to the second state based on the user information, and
   an exit floor determining process of determining whether the cage has arrived at an exit floor,
   wherein the in-cage condition judgment process includes:
      determining whether or not the user includes a wheelchair user; and
      determining whether or not the wheelchair user is facing the mirror display, and
   wherein the program causes the mirror display to function in the first state when the cage is determined to have arrived at the exit floor and the wheelchair is determined to be facing the mirror display.

2. The elevator display system according to claim 1, wherein the first state is a state of displaying an image filled in with a particular color on the mirror display.

3. The elevator display system according to claim 1, wherein the program which, when executed by the processor, further performs setting the mirror display to the first state at least for a period in which the elevator door is open in a case where the wheelchair user exists in the cage and the wheelchair user is facing the mirror display.

4. The elevator display system according to claim 1, wherein
   the program which, when executed by the processor, further performs an exit floor registration process in which the user registers an exit floor,
   the in-cage condition judgment process includes acquiring identification information on the wheelchair user, and
   the user information includes exit floor information acquired in the exit floor registration process, the judgment information indicating whether or not the wheelchair user is facing the mirror display, and the identification information on the wheelchair user in a form of being associated with each other.

5. The elevator display system according to claim 4, wherein the display control process includes setting the mirror display to the first state at least for a period in which the elevator door is open in a case where the wheelchair user exists in the cage, the wheelchair user is facing the mirror display, and the wheelchair user arrives at the exit floor.

6. The elevator display system according to claim 5, wherein
   the exit floor registration process is performed through one of a first unit arranged for a general user and a second unit arranged for a wheelchair user, the first unit and the second unit being separated from each other, and
   control in the display control process is performed while only an exit floor is inputted through the second unit by the wheelchair user.

7. The elevator display system according to claim 1, wherein
   the program which, when executed by the processor, further performs an operation mode acquisition process of generating operation mode information on the elevator,
   the in-cage condition judgment process operates when the operation mode information indicates a wheelchair operation mode as an operation mode in a case where the wheelchair user exists in the cage, and does not operate when the operation mode information indicates an operation mode other than the wheelchair operation mode, and
   the display control process includes setting the mirror display to the first state when the operation mode is an absence mode as an operation mode in a case where no user exists in the cage, and setting the mirror display to the second state when the operation mode is not the wheelchair operation mode or the absence mode.

8. The elevator display system according to claim 5, wherein the display image generation process includes making a part of the mirror display display an image based on content in a case where the display control process includes judging that the mirror display is set to the first state when the wheelchair user exits from the cage.

9. The elevator display system according to claim 1, further comprising an exit floor camera that photographs an outside of the cage, wherein the display image generation process includes making a part of the mirror display display an image acquired by the exit floor camera in a case where the display control process includes judging that the mirror display is set to the first state when the wheelchair user exits from the cage.

10. The elevator display system according to claim 1, wherein
the program which, when executed by the processor, further performs a current floor information acquisition process of acquiring a current position of the cage in an elevator shaft, and
the display image generation process includes making the mirror display display current floor information acquired in the current floor information acquisition process.

11. The elevator display system according to claim 1, further comprising a database that stores the content, including a material being a still image, motion video, graphics, a character string or a figure and formed of the material and arrangement information on the material, and playback timing information indicating timing of displaying the content on the mirror display,
wherein the display image generation process includes supplying display image data based on the content acquired from the database to the mirror display with timing based on the playback timing information.

12. An elevator display system comprising:
a sensor to acquire sensing data indicating condition of an inside of a cage of an elevator by photographing or detecting the condition of the inside of the cage;
a mirror display arranged in the cage on a side opposite to an elevator door, the mirror display functioning in a first state of being a mirror and functioning in a second state of being an image display by displaying an image based on display image data;
a processor to execute a program; and
a memory to store the program which, when executed by the processor, performs
a display image generation process of generating the display image data to be displayed on the mirror display;
an in-cage condition judgment process of judging condition of a user in the cage from the sensing data and outputting user information regarding the condition of the user; and
a display control process of outputting a control signal for setting a display state of a whole or part of a display surface of the mirror display to the first state or a control signal for setting the display state to the second state to the mirror display based on the user information, and
an exit floor determining process of determining whether the cage has arrived at an exit floor,
wherein the in-cage condition judgment process includes:
determining whether or not the user includes a wheelchair user; and
determining whether or not the wheelchair user is facing the mirror display, and
wherein the program causes the mirror display to function in the first state when the cage is determined to have arrived at the exit floor and the wheelchair is determined to be facing the mirror display.

13. The elevator display system according to claim 12, wherein the first state is a state in which power of the mirror display is off.

* * * * *